United States Patent
Govorov (10) Patent No.: US 10,317,581 B2
(45) Date of Patent: Jun. 11, 2019

(54) COMPOSITIONS HAVING A MIXTURE OF STRONGLY PLASMONIC NANORODS AND EXHIBITING AN EXTINCTION SPECTRUM TRANSPARENCY WINDOW

(71) Applicant: Ohio University, Athens, OH (US)

(72) Inventor: Alexander Govorov, Athens, OH (US)

(73) Assignee: Ohio University, Athens, OH (US)

(*) Notice: Subject to any disclaimer, the term of this patent is extended or adjusted under 35 U.S.C. 154(b) by 0 days.

(21) Appl. No.: 15/129,454

(22) PCT Filed: Mar. 27, 2015

(86) PCT No.: PCT/US2015/023023
§ 371 (c)(1),
(2) Date: Sep. 27, 2016

(87) PCT Pub. No.: WO2015/148940
PCT Pub. Date: Oct. 1, 2015

(65) Prior Publication Data
US 2017/0176650 A1    Jun. 22, 2017

Related U.S. Application Data

(60) Provisional application No. 61/971,897, filed on Mar. 28, 2014.

(51) Int. Cl.
*G02B 5/00* (2006.01)
*G02B 5/20* (2006.01)
(Continued)

(52) U.S. Cl.
CPC .......... *G02B 5/008* (2013.01); *G02B 1/002* (2013.01); *G02B 5/208* (2013.01); *G02B 5/22* (2013.01);
(Continued)

(58) Field of Classification Search
CPC ........ G02B 1/002; G02B 5/008; G02B 5/208; G02B 5/22
(Continued)

(56) References Cited

U.S. PATENT DOCUMENTS

2011/0109854 A1* 5/2011 Tang ............. G02F 1/195
                                                  349/117
2011/0116168 A1  5/2011 Nikoobakht
2013/0258456 A1* 10/2013 Hashimura ........ G02B 5/208
                                                  359/359

FOREIGN PATENT DOCUMENTS

WO       2013126271 A1    8/2013

OTHER PUBLICATIONS

Subrahmanyam et. al., a study of graphene decorated with metal nanoparticles, 2010, Chenimal physics letters, 497, 70-75.*

(Continued)

*Primary Examiner* — Robert E. Tallman
(74) *Attorney, Agent, or Firm* — Wood Herron & Evans LLP (57) ABSTRACT

A composition includes a first population of strongly plasmonic nanorods and a second population of strongly plasmonic nanorods. The two populations each have a size range of the nanorods, creating a size range gap between the two populations. This size range gap creates a transparency window that can be seen in an extinction spectrum of the composition, which is characterized by the sizes of the nanorods in both populations. The composition may be included in a filter providing a transparency to a defined wavelength characterized by the size range gap of the nanorods.

20 Claims, 9 Drawing Sheets

(51) Int. Cl.
  *G02B 5/22* (2006.01)
  *G02B 1/00* (2006.01)
  *G02B 27/00* (2006.01)
  *B82Y 20/00* (2011.01)

(52) U.S. Cl.
  CPC .......... *G02B 27/0012* (2013.01); *B82Y 20/00* (2013.01); *G02B 2207/101* (2013.01)

(58) Field of Classification Search
  USPC ........................................................ 359/350
  See application file for complete search history.

(56) References Cited

OTHER PUBLICATIONS

Kataura et. al., Optical properties of single-Wall carbon Nanotubes, Synthetic Metals (1999), 103, 2555-2558.*

Zhang et. al. , Plasmonic resonance excitation spectra of cross-shaped Ag Nanoparticles,Plasmopnics (2010), 5, 355-361.*

Knight et. al. , Aluminum plasmonic nanoantennas, Nanoletters, 2012, 12, 6000-6004.*

Maier et. al., plasmonic: localization and guiding of electromagnetic energy in metal/dielectric structures, 2005, Journal of Applied Physics, 98, 011101, 1-10.* http://www.nanopartz.com/bare_gold_nanorods.asp.

U.S. Patent and Trademark Office, International Search Report and Written Opinion in PCT/US2015/023023, dated Jun. 30, 2015 (10 pages).

Verellen, Niels, et. al., "Fano Resonances in Individual Coherent Plasmonic Nanocavities," Nano Letters, vol. 9, No. 4 (1663-1667), 2009 (5 pages).

Yang, Jihua, et. al., "Broadband Absorbing Exciton—Plasmon Metafluids with Narrow Transparency Windows," Nano Letters, Jan. 21, 2016 (6 pages).

Zhang, Hui, et al., "Plasmonic Metamaterials and Nanocomposites with the Narrow Transparency Window Effect in Broad Extinction Spectra," ACS Photonics, Apr. 2, 2014, 11 pages.

Zhang, Shuang, et. al., "Plasmon-Induced Transparency in Metamaterials," Physical Review Letters 101, 047401, Jul. 2008 (4 pages).

* cited by examiner

COMPOSITIONS HAVING A MIXTURE OF STRONGLY PLASMONIC NANORODS AND EXHIBITING AN EXTINCTION SPECTRUM TRANSPARENCY WINDOW

CROSS-REFERENCE TO RELATED APPLICATION

This application is a National Stage Entry under 35 U.S.C. § 371 of PCT Application No. PCT/US2015/023023, filed on Mar. 27, 2015, which claims priority to U.S. Application No. 61/971,897, filed Mar. 28, 2014, both of which are incorporated herein by reference in their entireties.

STATEMENT REGARDING FEDERALLY SPONSORED RESEARCH OR DEVELOPMENT

This invention was made with Government support under Grant Award No. W911NF-12-1-0407 awarded by the U.S. Army-Army Research Office. The Government has certain rights in this invention.

FIELD OF THE INVENTION

The present invention is generally related to the field of nanotechnology, and more particularly, to compositions that contain nanostructures and that tend to selectively filter radiation.

BACKGROUND OF THE INVENTION

Metal nanocrystals and metamaterials with strong plasmonic resonances in the visible and infrared spectral intervals often exhibit unique optical properties. In single nanocrystals with specially designed shapes, plasmonic resonances can be efficiently tuned with the geometry of the nanocrystals and can be made strong and narrow. These properties are characteristic for plasmonic nanorods that exhibit strong and narrow longitudinal resonances. Whereas nanospheres, nanorods, and nanocubes with small sizes can be grown using a colloidal synthesis in solution, larger-size nanostructures are conveniently fabricated by lithographic methods. Lithographically made 2D and 3D metamaterials employ electromagnetic interactions between building blocks to create interesting optical responses.

One of the prominent effects originating from the interactions between single nanocrystals is the Fano effect. This effect can occur in a purely plasmonic system or in hybrid exciton-plasmon nanostructures. The Fano effect typically originates from an interaction between broad and narrow resonances in a system composed of two or more elements. Another phenomenon, related to the plasmonic Fano effect, is the plasmon-induced transparency of planar metamaterials composed of a small number of interacting nanocrystals. This plasmon-induced transparency manifests as a localized maximum in a transmission plot, which generally also corresponds to a transparency window in an absorption plot. Additionally, spectral windows may be formed through an extraordinary optical transmission in plasmonic nanohole arrays. The transmission windows are attributed to the presence of constructive interference of surface plasmonic waves. The extraordinary optical transmission is an angle-dependent effect.

Prior to the present invention, isotropic optical materials with a broad extinction spectrum featuring a narrow transparency window were unknown. Such nanomaterials could be useful for smart coatings and screens for shielding electromagnetic radiation. Known planar nanostructures, which do exhibit the window effect, are anisotropic and exhibit interference effects. Planar Bragg reflectors and metamaterials exhibit strongly anisotropic transmission spectra. Additionally, Bragg-reflector filters and planar metamaterials featuring transmission bands are based on electromagnetic interference and interactions between their elements. However, designing a medium or metamaterial capable of attenuating light in a broad spectral interval while simultaneously exhibiting a narrow transparency window at a given wavelength has proven challenging.

SUMMARY OF THE INVENTION

In an attempt to overcome the noted difficulty, the present invention is directed toward another approach to creating a transparency window in nanostructured systems, by constructing a nanomaterial as a composition of single nanocrystals and nanocrystal complexes with narrow and tunable absorption lines.

The present invention is premised on the realization that a composition including nanorods with carefully selected sizes can act to filter certain wavelengths of radiation. The composition includes a first population of strongly plasmonic nanorods and a second population of strongly plasmonic nanorods. A size range gap exists between the first population and the second population, due to a difference in size between the first and second population. An extinction spectrum of the composition is very broad and includes a transparency window characterized by the size range gap. This extinction spectrum can be controlled or determined by selecting the sizes of the nanorods in the first and second populations to establish an appropriate size range gap.

In a second embodiment, a filter comprising the composition is provided. This filter provides a transparency to a defined wavelength characterized by the size range gap between the first population and second population, each of which have a minor dimension and a major dimension. The filter has an extinction spectrum with a spectral width given by a difference between the major dimension of the first population and the major dimension of the second population.

The objects and advantages of the present invention will be further appreciated in light of the following detailed description and drawings provided herein.

BRIEF DESCRIPTION OF THE DRAWINGS

The accompanying drawings, which are incorporated in and constitute a part of this specification, illustrate embodiments of the invention and, together with a general description of the invention given above and the detailed description given below, serve to explain the principles of the invention.

2 also depicts spherical- or disk-shaped nanoparticles, which may be used in a composition along with the first and second populations of nanorods.

FIG. 7 shows that as the length of the optical path increases, the width and amplitude of the transmission peak narrows and the magnitude of the transmission peak decreases. Therefore, with longer optical paths, one can make narrower transparency windows.

DETAILED DESCRIPTION OF THE INVENTION

Unless clearly defined otherwise from the context, any range of values presented in the following Detailed Description and Claims includes each end point as well as each whole number or fractional part thereof, within the recited range. Additionally, approximating language may be applied to modify any quantitative representation that may vary without resulting in a change in the basic function to which it is related. Accordingly, a value modified by a term or terms, such as "about" and "substantially," may not be limited to the precise value specified.

According to exemplary embodiments of the present invention, a composition of strongly plasmonic nanorods (hereafter "nanorods") is formed. The composition, or blend, includes a mixture of nanorods of different sizes. The specially-designed size distribution of nanorods results in a broad extinction spectrum having a narrow transparency window over a defined wavelength range.

Figure 1:
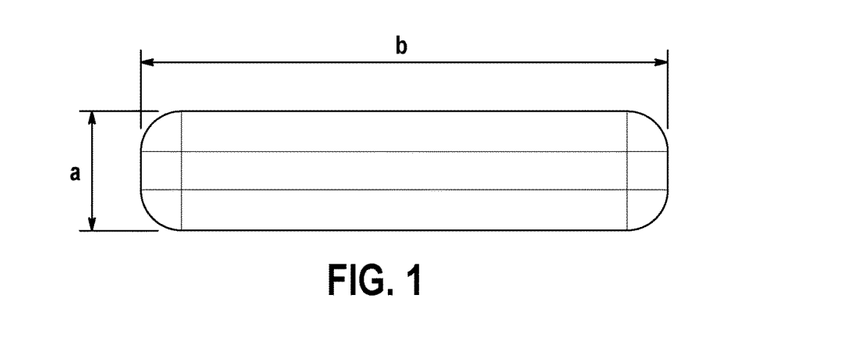
FIG. 1 is a schematic depiction of a nanorod having a minor dimension (a) and a major dimension (b).
Figure 3:
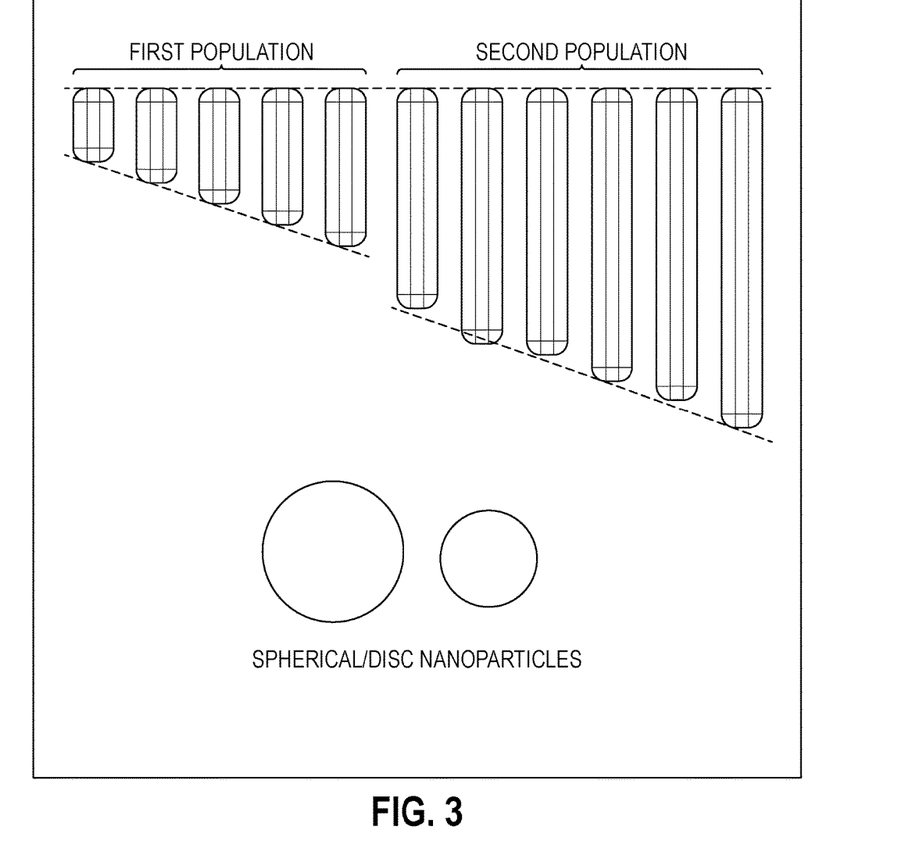
FIG. 3 is a schematic depiction of components of a composition of nanorods, including a first population of nanorods having a first size range, a second population of nanorods having a second size range, and a size range gap between the first size range and the second size range. FIG.
Figure 8:
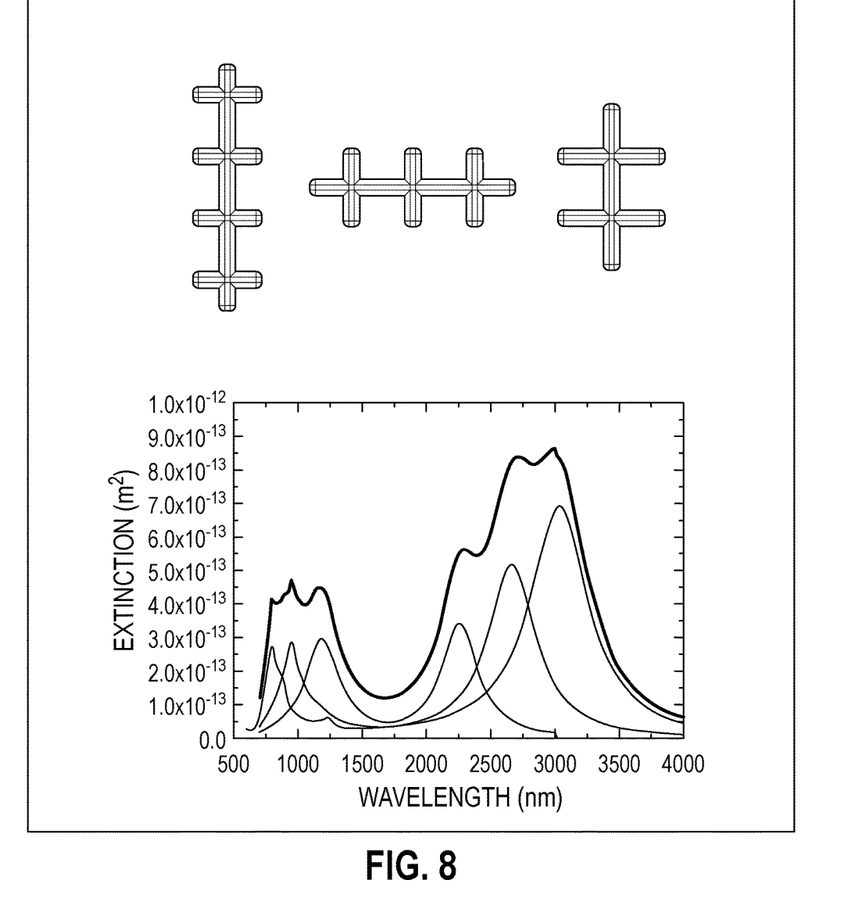
FIG. 8 includes a plot of extinction spectra for both individual cross-shaped nanorods and a combination thereof. Each cross-shaped nanorod includes a first segment and one or more second segments extending generally transverse to the first segment. The extinction spectra are plotted as a function of wavelength, and as shown, each cross-shaped nanorod exhibits two localized maxima separated by a localized minimum. Thereby, the combination of the cross-shaped nanorods also exhibits a localized minimum (transparency window) between two generally flat regions.

As used herein, the term "nanorod" encompasses nanoscale objects having a generally linear and elongated form, with a major dimension and a minor dimension as shown in FIGS. 1 and 3. In addition, the term "nanorod" encompasses other forms, including those that represent variations of, or combinations of, objects having a generally linear form. For example, FIG. 8 shows cross-shaped nanorods having a first segment and one or more second segments that extend generally transverse to the first segment. In particular, FIG. 8 shows cross-shaped nanorods having two, three, and four second segments. FIG. 8 also shows the absorption characteristics of individual cross-shaped nanorods (thin curves), as well as the absorption characteristics of a composition having a combination of the cross-shaped nanorods (thick curve). In particular, each cross-shaped nanorod exhibits two localized maxima separated by a localized minimum. Thereby, the combination of the cross-shaped nanorods also exhibits a localized minimum (transparency window) between two generally flat regions. "Nanorod" also encompasses rectangular and triangular prisms, and in some cases, spheres.

The nanorods of the composition may be any suitable strongly plasmonic nanorods or nanorods with a strong dielectric contrast to air. For example, strongly plasmonic metal nanorods, such as gold, silver, copper, and aluminum nanorods may be used. Also, undoped and doped silicon semiconductor nanorods with strong dielectric contrast to air or with infrared-plasmonic properties may be used. Strongly plasmonic superconductor nanorods may also be used, as well as strongly plasmonic nanorods formed of graphene. Other materials with high conductivity and strong plasmonic resonance, such as TiN nanorods, can also be used. TiN, for example, can be used in the form of nanorods or in other shapes, such as nano-shells for instance.

The nanorods of the composition may be formed by any suitable process. Two approaches are presently known: (1) colloidal synthesis in solution, and (2) lithographic fabrication. Generally, synthesis in solution provides smaller nanorods that are useful for compositions that provide a transparency window in the visible (400 nm to 700 nm) and near-infrared (700 nm to 1400 nm) ranges. For example, synthesis in solution can be used to produce nanorods that have a major dimension of about 30 nm to 1000 nm. Lithographic fabrication provides larger nanorods that are useful for compositions that provide a transparency window in the infrared (700 nm to 1 mm) range. For example, lithographic fabrication can be used to produce nanorods that have a major dimension of about 50 nm to about 1 mm, and a minor dimension of about 40 nm to about 10000 nm. In the lithographic approach, nanorods are first fabricated on a substrate and then released to a solution or polymer using chemical etching. Alternatively, the nanorods could be fabricated directly on a flake acting as a substrate. Suitable colloidal nanorods are also commercially available, such as those offered by Nanopartz Inc. of Loveland, Colo.

Figure 2:
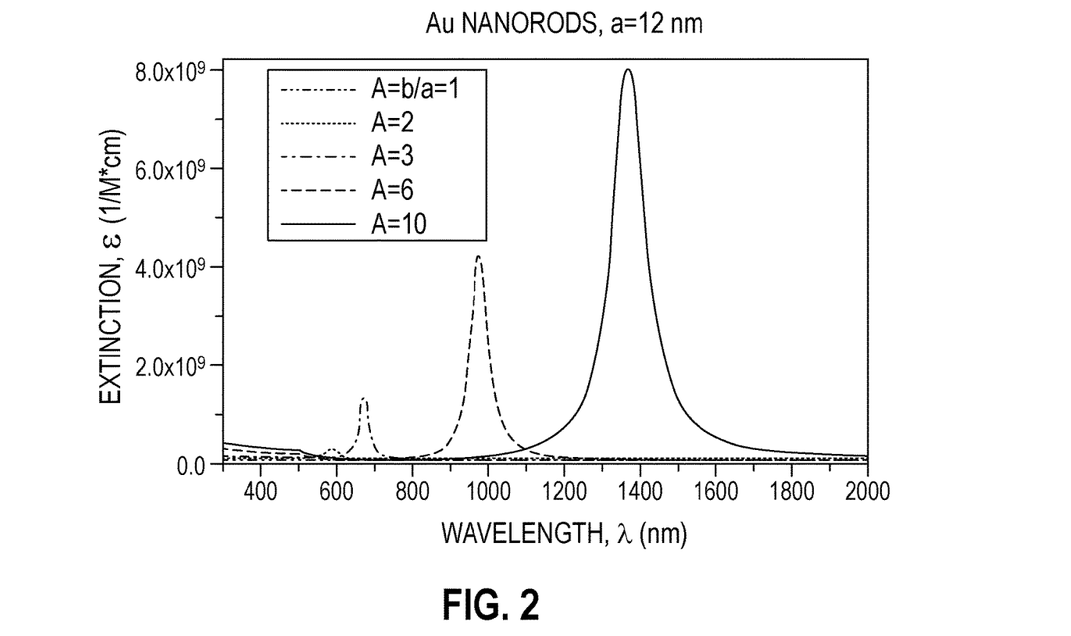
FIG. 2 is a plot showing extinction spectra for nanorods having different aspect ratios (b/a). The extinction spectra are plotted as a function of wavelength, and as shown, the peaks in the spectra are narrow and depend on the aspect ratios of the nanorods.

An exemplary nanorod is shown in FIG. 1 and includes a minor dimension (a) and a major dimension (b). An aspect ratio of the nanorod is defined as the ratio of the major dimension to the minor dimension, which is represented by the quotient b/a. Suitable nanorods are generally straight and rigid. The size of the minor dimensions and the major dimensions of the nanorods of the composition may be selected to influence the extinction spectrum characteristics of the composition. For example, as shown in FIG. 2, the absorption peak depends on the aspect ratio of the nanorod.

In particular, as the aspect ratio increases, the location of the absorption peak corresponds with higher wavelengths and the magnitude of the absorption peak increases.

A composition, or blend, is formed by combining a first population of nanorods and a second population of nanorods. The first population has a first size range and the second population has a second size range. A size range gap exists between the first size range and the second size range, creating one or more transparency windows.

FIG. 3 shows a first population of nanorods and a second population of nanorods. As shown, the minor dimension of the nanorods is generally similar. The nanorods of the first population have major dimensions that vary between a first minimum (furthest to the left) and a first maximum. The nanorods of the second population have major dimensions that vary between a second minimum and a second maximum (furthest to the right). The size range gap is illustrated by the discontinuity in sizes of the major dimensions between the first maximum and the second minimum (generally in the middle, where the dashed line connecting the bottoms of the nanorods is broken).

Although in the particular nanorods in FIG. 3, all nanorods have the same minor dimension, such uniformity is not a requirement for the inventive material. A material with a transparency window can also be constructed from nanorods with different minor dimensions. For the window effect, the composition of nanorods may have a gap in the set of plasmonic wavelengths of the individual nanorods.

The composition of nanorods can absorb and scatter incident radiation. Without being limited by any particular theory or mechanism, theoretical calculations and preliminary experimental data suggest that the size range gap influences the transparency window of the extinction spectrum for the composition. In particular, theoretical computations suggest that the first population of nanorods contributes to absorption in a lower wavelength interval, and that the second population of nanorods contributes to absorption in a higher wavelength interval. The size range gap contributes to a wavelength interval where absorption is comparatively low, thereby providing a transparency window where radiation is transmitted through the composition.

Selecting the first size range, the second size range, and the size range gap provides control over the characteristics of the transparency window. For example, the first size range, the second size range, and the size range gap can be selected in order to provide a transparency window at a defined wavelength or over a defined wavelength range, such as in the visible spectrum, the infrared spectrum, or the microwave spectrum, for example. In particular, the absorption peaks of the individual nanorods and nanoparticles collectively provide two flat regions in the extinction spectrum of the composition. The absorption minima of the individual nanorods and nanoparticles collectively provide a localized minimum (transparency window) in the extinction spectrum of the composition, the transparency window being between the two flat regions. Advantageously, the first size range, the second size range, and the size range gap are chosen to provide a transparency window that is deep and narrow, and whose edges are sharply defined. Computer modeling techniques familiar to those of ordinary skill in the art may be used, for example, to identify suitable parameters of the composition, including the first size range, the second size range, and the size range gap.

The nanorods of the first population and the nanorods of the second population may have minor dimensions that are generally similar. Generally, the minor dimensions may be between about 5 nm and about 200 nm. For example, in some embodiments the minor dimensions of the nanorods of the first population and the second population may be about 12 nm.

Generally, the major dimensions will be at least about 10 nm and up to about 2000 nm. Also generally, the nanorods may have a ratio of minor dimension/major dimension, for example, of about 5 nm/2000 nm (1:400) to about 1.

As shown in FIG. 3, the first population of nanorods includes nanorods of different sizes. The major dimensions of the nanorods of the first population vary between a first minimum and a first maximum. For example, the first minimum and the first maximum can be between about 44 nm and about 60 nm. Particularly, the range of major dimension values can be about 44 nm, 48 nm, 52 nm, 56 nm, and 60 nm, wherein 44 nm is the first minimum and 60 nm is the first maximum. In an exemplary embodiment, the first population will have major dimensions between about 44 nm and about 60 nm. The major dimensions of the first population are chosen to influence the absorption characteristics of the composition. In particular, the major dimensions of the first population are chosen to provide absorption of wavelengths generally below 880 nm, such as between about 300 nm and 880 nm.

As also shown in FIG. 3, the second population of nanorods includes nanorods of different sizes. The major dimensions of the nanorods of the second population vary between a second minimum and a second maximum. For example, the second minimum and the second maximum can be between about 80 nm and about 132 nm. Particularly, the range of major dimension values can be about 80 nm, 86 nm, 92 nm, 102 nm, 112 nm, and 132 nm, wherein 80 nm is the second minimum and 132 nm is the second maximum. In an exemplary embodiment, the second population will have major dimensions between about 80 nm and about 132 nm. The major dimensions of the second population are also chosen to influence the absorption characteristics of the composition. In particular, the major dimensions of the second population are chosen to provide absorption of wavelengths generally above 1010 nm, such as between about 1010 nm and 1500 nm.

By selecting the major dimensions of the first and second populations to provide absorption at wavelengths below 880 nm and above 1010 nm, a transparency window can be provided where wavelengths between 880 nm and 1010 nm are not absorbed. Thereby, some or all of radiation having wavelengths between 880 nm and 1010 nm is not absorbed by the composition, and is allowed to transmit through the composition. Advantageously, absorption within the transparency window is minimized, and absorption outside the transparency window is maximized. Also advantageously, transmission within the transparency window is maximized, and transmission outside the transparency window is minimized.

Thus, the first size range is characterized by the minor dimensions and major dimensions of the nanorods of the first population, and the second size range is characterized by the minor dimensions and major dimensions of the nanorods of the second population. Also, the size range gap is characterized by the gap between the first maximum and the second minimum. For the above given exemplary embodiments, the size range gap is between about 60 nm and about 80 nm. Thereby, the exemplary composition does not include nanorods whose major dimension is between about 60 nm and about 80 nm.

Figure 4:
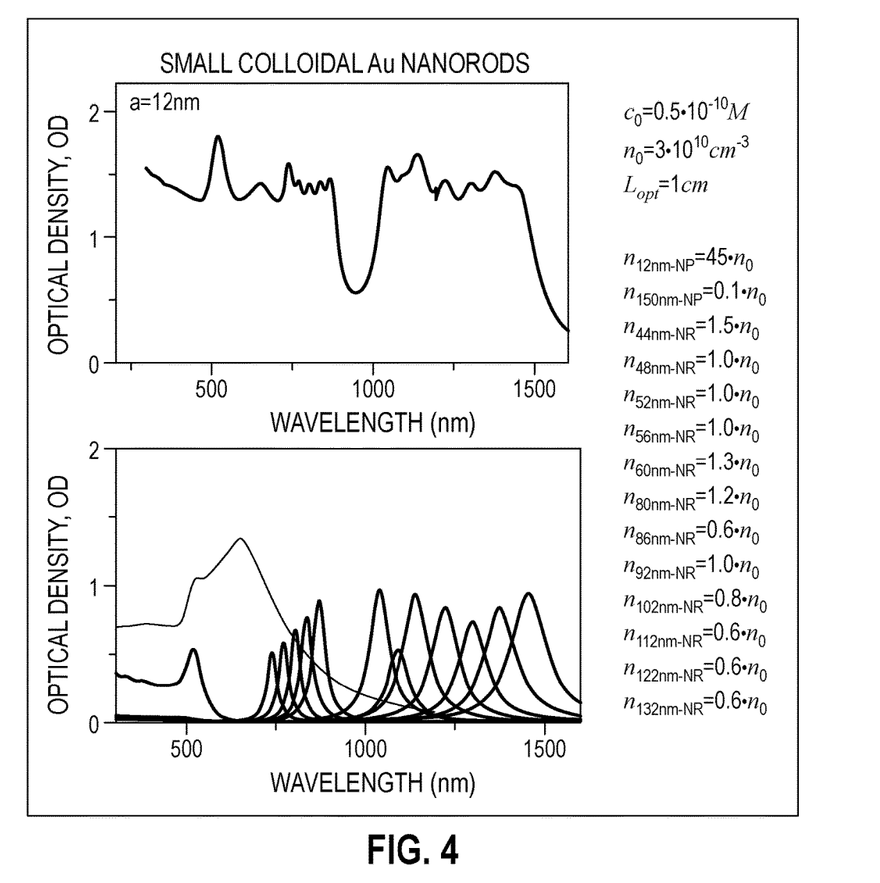
FIG. 4 includes two plots of optical density presented as a function of wavelength. The upper plot reflects the absorption of a composition having a first population of nanorods having a first size range, a second population of nanorods having a second size range, a size range gap between the first size range and the second size range, and spherical nanoparticles of two sizes. The lower plot reflects the absorption of the individual nanorods and nanoparticles of the composition of the upper plot. Nanorods and nanoparticles of such dimensions can be fabricated by colloidal synthesis.
Figure 5:
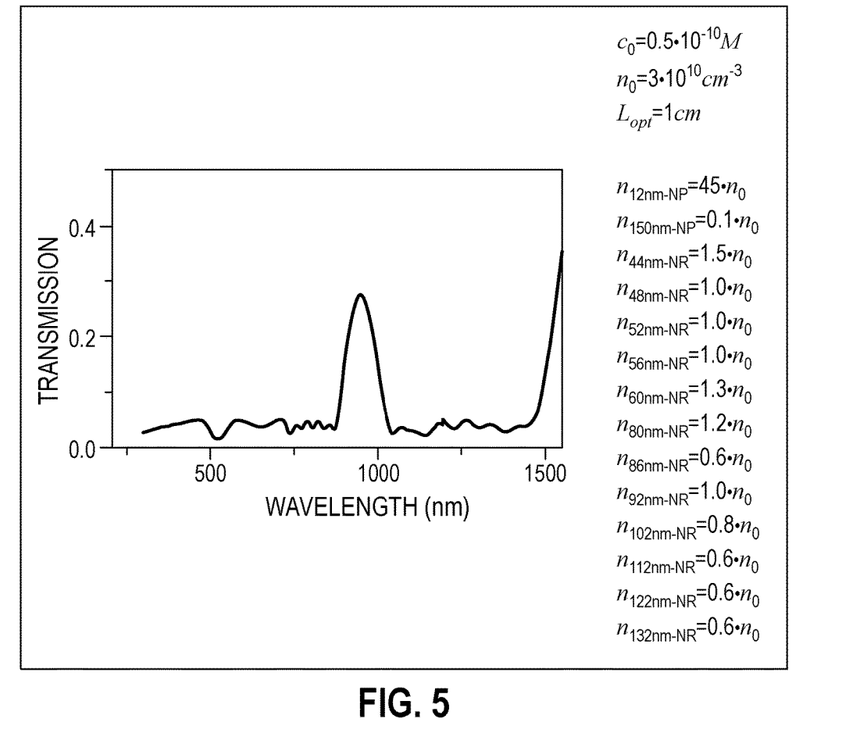
FIG. 5 is a plot of the transmission of the composition reflected in the upper plot of FIG. 4. A localized maximum of the transmission plot of FIG. 5 generally corresponds with the transparency window of the upper plot of FIG. 4.

FIG. 4 shows optical density plots presented as a function of wavelength. In particular, the upper plot reflects the absorption of a composition having a first population of nanorods having a first size range, a second population of nanorods having a second size range, a size range gap between the first size range and the second size range, and optionally spherical nanoparticles of two sizes. The lower plot reflects the absorption of the individual nanorods and nanoparticles of the composition of the upper plot. The upper plot shows that the composition is characterized by a transparency window between about 880 nm and about 1010 nm, with a localized minimum at about 950 nm. Thus, the composition absorbs more strongly at wavelengths outside the 880 nm to 1010 nm transparency window. For example, the composition absorbs more strongly at 600 nm and 1200 nm than between 880 nm and 1010 nm. Absorption in the 880 nm to 1010 nm transparency window is relatively lesser. Thereby, the composition absorbs incident radiation more strongly at wavelengths other than the 880 nm to 1010 nm transparency window, and transmits a greater portion of the incident radiation at wavelengths falling within this transparency window. Transmission within this transparency window is shown in FIG. 5.

Figure 6:
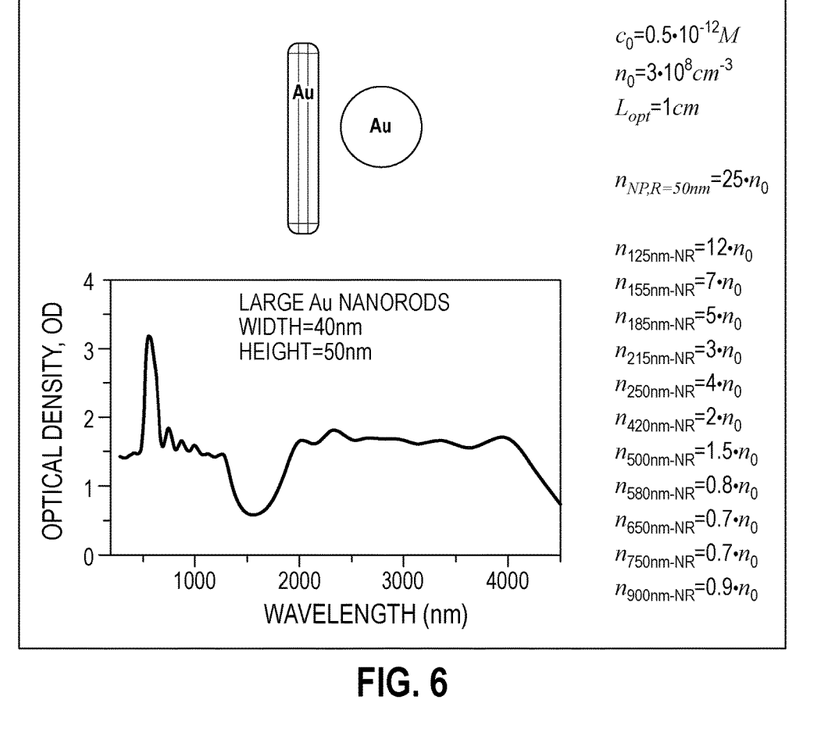
FIG. 6 is a plot of the optical density as a function of wavelength, of a composition of comparatively larger nanorods and nanoparticles. Nanorods and nanoparticles of such dimensions can be fabricated by a lithographical approach.
Figure 7:
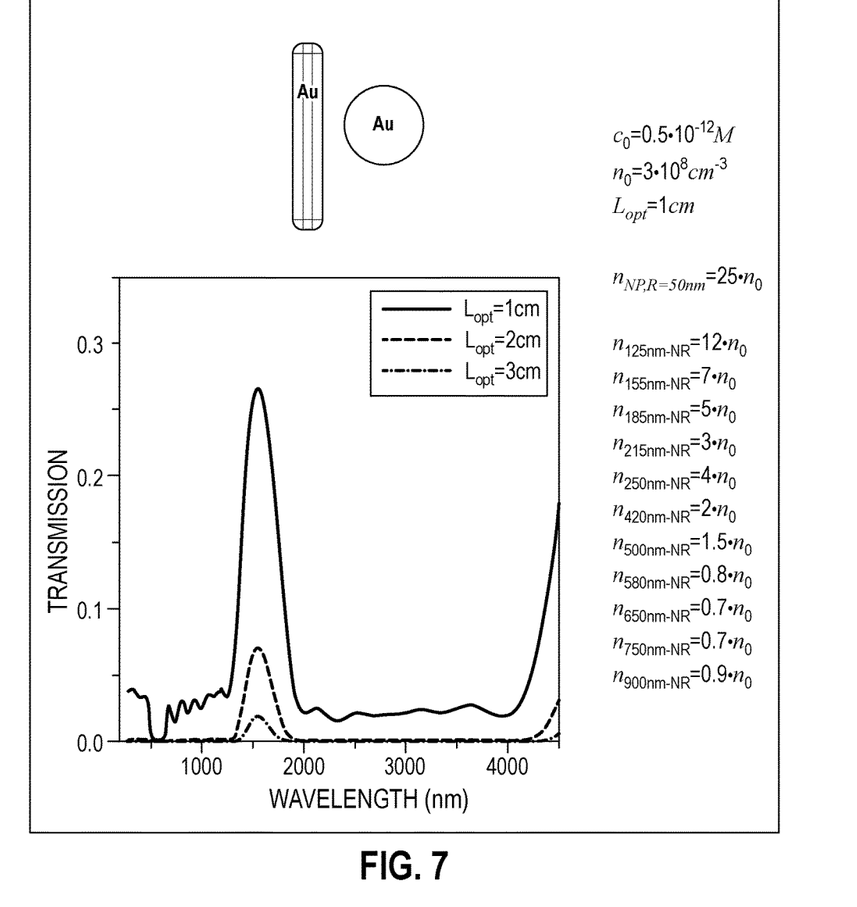
FIG. 7 is a plot of the transmission of the collection of nanorods and nanoparticles of FIG. 6.

FIGS. 6 and 7 show optical density and transmission plots, respectively, for comparatively larger nanorods and nanoparticles. FIG. 6 shows that a localized minimum of the optical density plot (transparency window) is located between about 1300 nm and about 1800 nm. Transmission in the 1300 nm to 1800 nm transparency window range is shown in FIG. 7. FIG. 7 also shows that as the length of an optical path increases, the width of the transmission peak narrows and the magnitude of the transmission peak decreases. Thereby, the length of an optical path can be selected to further influence the absorption characteristics of a composition.

One or more populations of additional nano-scale objects or nanoparticles may be included in the composition for influencing the absorption characteristics of the composition. For example, a population of generally spherical nanoparticles having a diameter of about 10 nm to about 300 nm may be included, and may influence absorption in the wavelength range of about 300 nm to about 700 nm. In addition, a population of nanorods having a major dimension greater than about 156 nm may be included, and may influence absorption in the wavelength range of about 2000 nm to about 10000 nm. The material may also have a population of nanodisks (FIG. 9c) with a height of 10 nm-200 nm and a diameter of 40 nm-1000 nm.

Figure 9A:
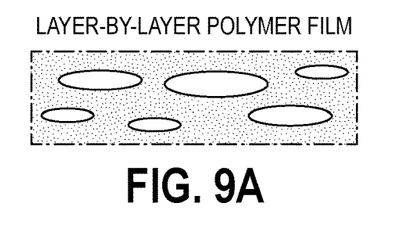
FIG. 9 depicts embodiments of compositions as disclosed herein, including: (a) as layer-by-layer deposited polymer films with horizontally-oriented nanorods; (b) as randomly oriented nanorods in 3D media, which can be liquid, polymer, or air; (c) as a set of nanocrystals on a substrate, such as a flake; and (d) as nanorod flakes in air or liquid.
Figure 9B:
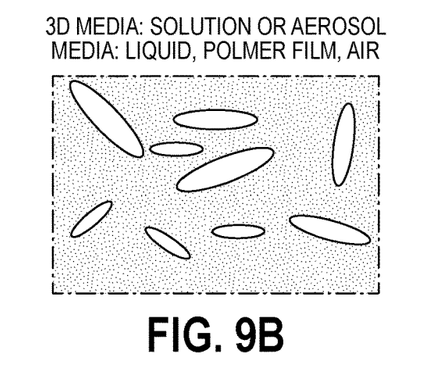
Figure 9C:
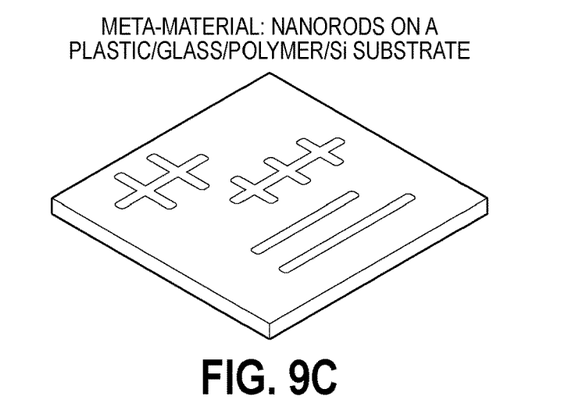

Blended compositions of nanorods, as discussed above, can be used in various useful embodiments. For example, a filter can be created that includes the composition of nanorods to provide transparency at a defined wavelength but shield the electromagnetic waves in a very broad wavelength interval (about 300 nm to about 1 mm), wherein the nanorods are incorporated into a transparent material such as a transparent polymeric article. These articles could be windows, visors, and windshields, for example. The nanorods could also be incorporated into other suitable transparent and translucent thermoset and thermoplastic polymers, such as polycarbonates, i.e. Lexan. The nanorods may simply be blended with the polymer, and a surfactant may be used, if necessary. The defined transparency window wavelength range is characterized by the size range gap between the first population of nanorods and the second population of nanorods. For example, the filter can provide a transparency to a defined wavelength in the visible spectrum or the infrared spectrum. FIG. 9(a), for example, shows a layer-by-layer polymer film that includes a composition of nanorods, and FIG. 9(c) shows a composition of nanorods on a substrate.

Figure 9D:
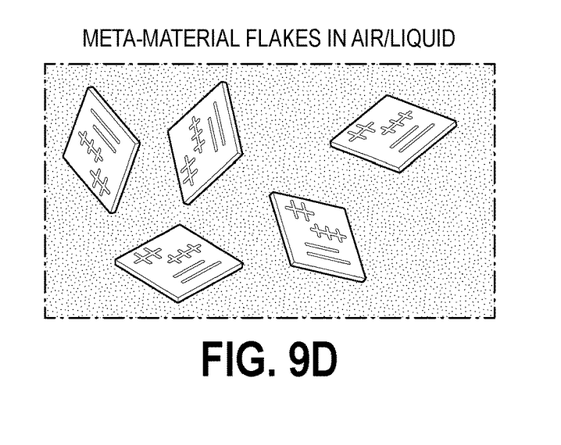
Figure 10:
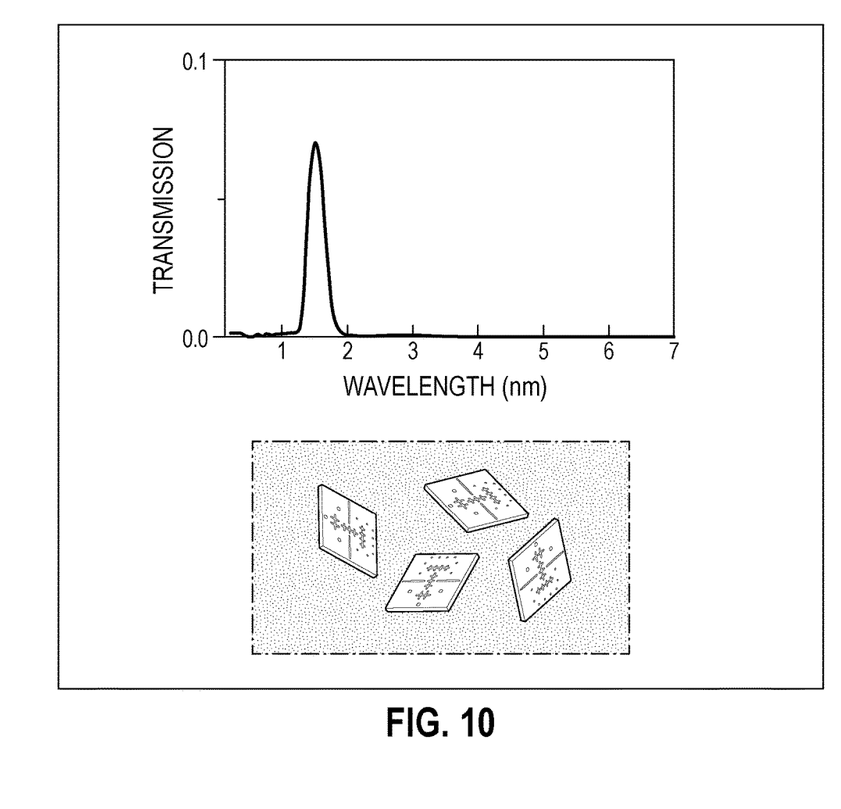
FIG. 10 depicts a theoretical representation of the transmission of nano-structured flakes. The transparency window is in the IR region.

Compositions of nanorods can also be mixed with a solvent to form a colloidal solution. For example, water, alcohol, and hexane are suitable solvents for mixing with the composition. FIG. 9(b), for example, shows a composition of nanorods in 3D media, such as in solution, and FIG. 9(d) shows a composition of nanorods incorporated into flakes dispersed in air or liquid. FIG. 10 depicts a theoretical representation of the transmission of such nano-structured flakes. As can be seen from the graph, the transparency window is in the IR region.

Compositions of nanorods can also be suspended in an aerosol such as smoke. This can be sprayed in an area to shield from electromagnetic radiation in a very broad wavelength interval, but this aerosol would still transmit electromagnetic waves at the wavelength of the transparency window. For example, a smoke containing the nanorods could be dispersed in a manner to generally obscure or hide an object (or person). The smoke would thereby absorb the radiation in a broad wavelength interval, as discussed above, but would not absorb radiation corresponding with the transparency window. Radiation corresponding with the transparency window would be allowed to transmit through the smoke, both toward and away from the object. For example, an external source could communicate with the object using radiation corresponding with the transparency window, notwithstanding the smoke, because the smoke would not absorb radiation corresponding with the transparency window. Similarly, the object could communicate with the external source using radiation corresponding with the transparency window, again notwithstanding the smoke, because the smoke would allow radiation corresponding with the transparency window to transmit through the smoke. For the aerosol application, one or more nanorods can be incorporated inside larger polymeric particles that are dispersed in air. Also, individual nanorods can be covered with a polymer for protection and durability. In the aerosol application, the width of the medium can be centimeters or meters. FIG. 9(b), for example, shows a composition of nanorods in 3D media, such as in an aerosol, and FIG. 9(d) shows a composition of nanorods incorporated into flakes in air or liquid.

Compositions of nanorods, nanoparticles, nano-shells, and other shapes can also be mixed with free water droplets in air and polymer shells filled with water in air. Such compositions exhibit a strong absorption band in the spectral region with wavelength >1200 nm. Such an absorption band may be characteristic of a composition that has a transmission window in the interval of wavelength <1200 nm. In water, such an absorption band starts very abruptly at 1200 nm. Nanorods and other shapes comprising TiN, for example, are well-suited for these compositions.

Thin films containing a composition of nanorods can be applied as coatings on any solid surface. For example, one or more compositions of nanorods can be coated onto a transparent surface to form an electromagnetic shield with a transparency window (filter). The thickness of the film can be adjusted to achieve desired light filtration. For example, a several nanometer thick coating of gold nanorods can effectively filter light. In solutions, the filter could be millimeters or centimeters in depth, depending on the concentration of the nanorods. In the aerosol form, the filter width could range from a few centimeters to a few meters and longer.

Any suitable concentration of the nanorods in a composition may be used, and the concentration may depend on a particular application. Generally, the concentration will be defined in terms of number of particles per $cm^3$ and can be adjusted based on the sizes of the nanorods used and the intended application or results. For example, where smaller nanorods are used, a larger concentration may be needed. But generally, the concentration will be between about $10^8$ and about $10^{14}$ particles per cm$^3$.

Interactions between nanorods in the composition can alter the absorption characteristics of the composition, in some instances altering the transparency window effect. To avoid such negative interactions, the minimum distance between nanorods in the composition should be about equal to the length of the longest nanorods in the composition. Various spatial arrangements of nanocrystals on a substrate, deposited for example using lithography, can be used to minimize the negative interactions.

This has been a description of the present invention along with the various methods of practicing the present invention. However, the invention itself should only be defined by the appended claims.

What is claimed is:

1. A composition, comprising:
    a first population of strongly plasmonic nanorods, the first population having a first size range of the nanorods, the first population, the first population having an absorption peak at a wavelength included in a visible light spectrum, and
    a second population of strongly plasmonic nanorods, the second population having a second size range of the nanorods,
    wherein a size range gap exists between the first size range and the second size range, and
    wherein an extinction spectrum of the composition is characterized by the first size range and the second size range and includes a transparency window characterized by the size range gap.

2. The composition of claim 1, each nanorod of the first population and the second population having a minor dimension and a major dimension, the minor dimensions of the nanorods being the same.

3. The composition of claim 1, wherein each nanorod of the first population and the second population have a minor dimension and a major dimension, the major dimensions of the nanorods of the first population varying between a first minimum and a first maximum, and the major dimensions of the nanorods of the second population varying between a second minimum and a second maximum.

4. The composition of claim 1, wherein each nanorod of the first population and the second population have a minor dimension and a major dimension, the minor dimensions of the nanorods being between 10 nm and 2000 nm.

5. The composition of claim 4, the major dimensions of the nanorods of the first and second populations varying between 10 nm and 1 mm.

6. The composition of claim 1, further comprising:
    a population of generally spherical nanoparticles having a diameter of between 10 nm and 1000 nm.

7. The composition of claim 1, further comprising:
    a population of nanorods having a major dimension greater than 10 nm.

8. A filter comprising the composition of claim 1, the filter providing a transparency to a defined wavelength characterized by the size range gap between the first population of nanorods and the second population of nanorods, the first population and the second population having a minor dimension and a major dimension, and the filter having an extinction spectrum with a spectral width given by a difference between the major dimension of the first population and the major dimension of the second population.

9. The filter of claim 8, the defined wavelength being in the visible spectrum.

10. The filter of claim 8, the defined wavelength being in the infrared spectrum.

11. A colloidal solution comprising the composition of claim 1 and a solvent.

12. The composition of claim 1 in combination with a polymer.

13. The composition of claim 1, wherein the nanorods are metal nanorods.

14. The composition of claim 13, wherein the metal nanorods are selected from the group consisting of gold, silver, copper, and aluminum.

15. The composition of claim 1, wherein the nanorods are semiconductor nanorods or superconductor nanorods.

16. The composition of claim 1, wherein the nanorods are formed of graphene.

17. The composition of claim 1, wherein the nanorods include cross-shaped nanorods.

18. The composition of claim 1, wherein the nanorods are encapsulated.

19. The composition of claim 1, wherein the nanorods are incorporated into flakes.

20. The composition of claim 1, wherein the nanorods include simple nanorods, cross-shaped nanorods, and nanodisks, and the nanorods are arranged on a substrate or a flake.

* * * * *

UNITED STATES PATENT AND TRADEMARK OFFICE
CERTIFICATE OF CORRECTION

| | | |
|---|---|---|
| PATENT NO. | : 10,317,581 B2 | Page 1 of 1 |
| APPLICATION NO. | : 15/129454 | |
| DATED | : June 11, 2019 | |
| INVENTOR(S) | : Alexander O. Govorov | |

It is certified that error appears in the above-identified patent and that said Letters Patent is hereby corrected as shown below:

On the Title Page

Page 2, Column 1, item (56) Other Publications, last line reads "Plasmopnics" and should read --Plasmonics--

In the Specification

Column 1, Line 26 reads "nanotechnology, and" and should read --nanotechnology and,--

Column 2, Line 29 reads "population." and should read --populations.--

Column 2, Line 39 reads "have a minor" and should read --has a minor--

Column 2, Line 60 reads "wavelength, and" and should read --wavelength and,--

Column 2, Line 67 to Column 3, Line 1 reads "FIG. 2" and should read --FIG. 3--

Column 3, Line 34 reads "wavelength, and" and should read --wavelength and.--

In the Claims

Claim 1, Column 9, Lines 23-24, the first instance of "the first population," should be deleted Claim 3, Column 9, Line 40 reads "population have" and should read --population has--

Claim 4, Column 9, Line 47 reads "population have" and should read --population has--

Signed and Sealed this
Seventh Day of December, 2021

Drew Hirshfeld
*Performing the Functions and Duties of the*
*Under Secretary of Commerce for Intellectual Property and*
*Director of the United States Patent and Trademark Office*